(12) United States Patent
Kranjc

(10) Patent No.: US 7,449,647 B2
(45) Date of Patent: Nov. 11, 2008

(54) POSITION TRANSDUCER OF WATER LEVEL IN MACHINE BASIN

(75) Inventor: Igor Kranjc, Tolmin (SI)

(73) Assignee: ITW Metalflex, Tolmin (SI)

( * ) Notice: Subject to any disclaimer, the term of this patent is extended or adjusted under 35 U.S.C. 154(b) by 239 days.

(21) Appl. No.: 11/419,712

(22) Filed: May 22, 2006

(65) Prior Publication Data
US 2008/0041710 A1    Feb. 21, 2008

(30) Foreign Application Priority Data
May 23, 2005    (SI)    .............................. P-200500152

(51) Int. Cl.
*H01H 35/26*    (2006.01)
(52) U.S. Cl. .............................. 200/83 WM; 200/83 R; 200/83 S
(58) Field of Classification Search ............ 200/83 WM
See application file for complete search history.

(56) References Cited

U.S. PATENT DOCUMENTS 3,209,094 A * 9/1965 Bauer ..................... 200/83 P
3,444,341 A * 5/1969 Mighton ................... 200/82 C
3,594,521 A   7/1971 Roll et al.
4,671,116 A * 6/1987 Glennon et al. ............ 73/728
5,310,970 A * 5/1994 Kaigler et al. ............ 200/83 R

FOREIGN PATENT DOCUMENTS

| DE | 4104477 A1 | 8/1992 |
| DE | 19754616 A1 | 6/1998 |
| DE | 19835865 A1 | 2/1999 |
| JP | 1320098 A | 12/1989 |
| WO | 02097374 A | 12/2002 |
| WO | 03078951 A1 | 9/2003 |
| WO | 2005002887 A2 | 1/2005 |

* cited by examiner

*Primary Examiner*—Elvin G Enad
*Assistant Examiner*—Lheiren Mae A Anglo
(74) *Attorney, Agent, or Firm*—Lowe, Hauptman, Gilman & Berner, LLP

(57) ABSTRACT

A position transducer of water level in a machine basin, preferably in a drum-type washing machine or a dishwasher and the like, transforms information relating to the water level in the flood basin of the machine into an electric signal to activate an execution organ. The circuit realizing the transformation is an embedded contact lamella provided with electronic members. Integrally with the step of embedding, a snap arrangement is prepared for engaging and retaining a connector connected to the circuit.

4 Claims, 1 Drawing Sheet

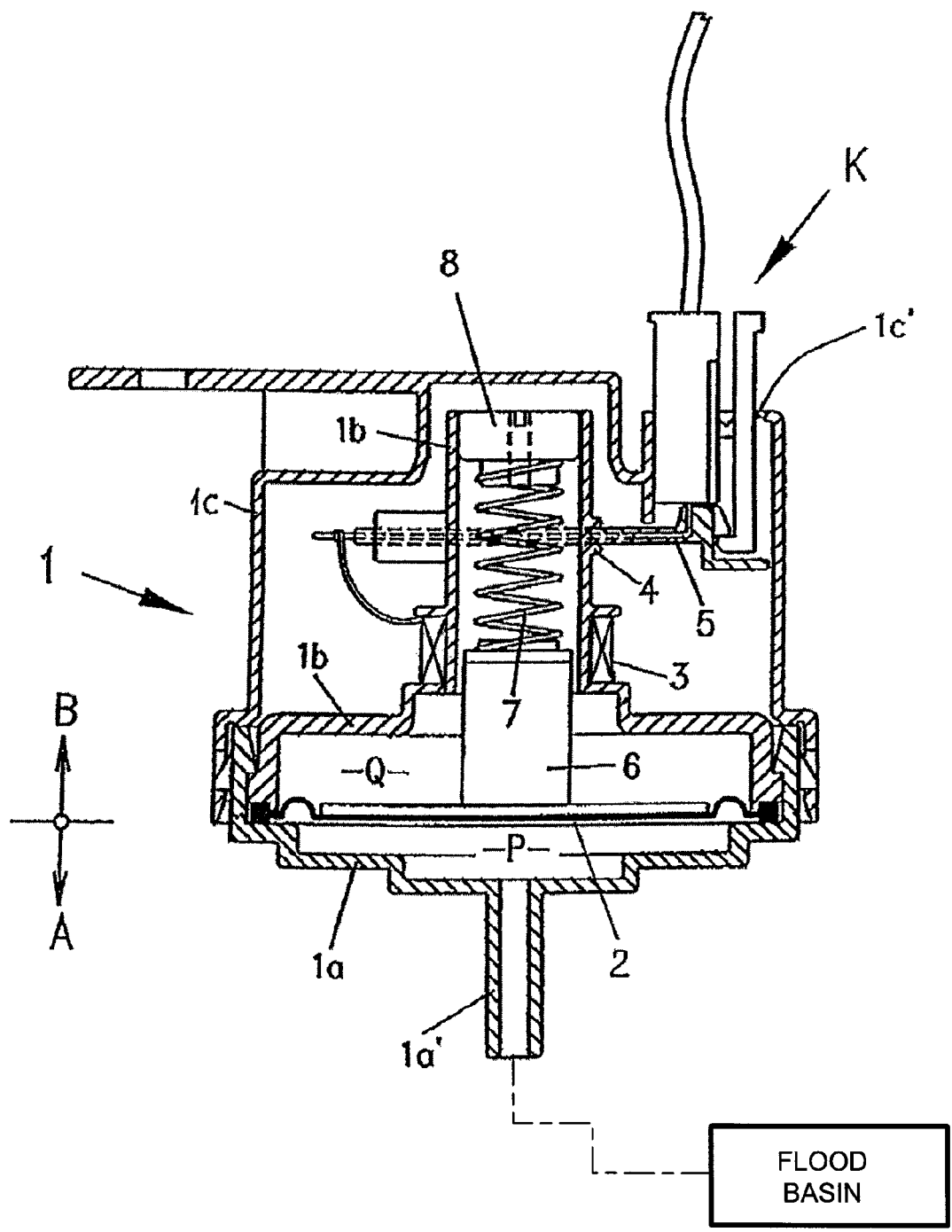

POSITION TRANSDUCER OF WATER LEVEL IN MACHINE BASIN

RELATED APPLICATIONS

The present application is based on, and claims priority from, Slovenian Patent Application Number P-200500152, filed May 23, 2005, the disclosure of which is hereby incorporated by reference herein in its entirety.

TECHNICAL FIELD

The present invention relates to a position transducer of water level in a machine basin, preferably in a drum-type washing machine or a dishwasher and the like.

BACKGROUND

WO 03/078951 A1 (Bindocci et al.) discloses a position transducer for transforming information relating to the water level in the flood basin of the machine into an electric signal to activate an execution organ to turn on/off the water. The position transducer includes upstream and downstream sections separated from each other by a membrane tightly engaged in the housing of the transducer. The upstream section includes a tube led into the flood basin of the machine. A first, free, entering end of the tube resides at the bottom of the flood basin and its second end is tightly fixed to the housing of the transducer. The downstream section includes a spring-supported armature fixed to the membrane. The armature is axially freely movably inserted into a central bearing of an inductive winding stably retained in the housing of the transducer. The downstream section further includes a substantially flat circuit also stably retained in the housing of the transducer and installed in a cross-sectional area of the housing of the transducer. One side of the flat circuit provides two pins to connect the ends of the inductive winding and another side thereof provides plug points to accommodate a connector, by means of which the transducer is incorporated into the processing appliance of the machine.

Water enters the machine and leaves it according to a machine process layout, whereat the present transducer generates information relating to the water level as prescribed by the machine process layout. The respective information is created on the basis of balancing the static pressure of air inside the upstream section of the transducer and the static pressure of water in the flood basin.

If there is no water in the flood basin, atmospheric pressure prevails with the upstream section of the transducer. In all other technical situations, a positive pressure prevails. The higher the water level during the operation, the higher said positive pressure. A change of air pressure at the upstream section of the transducer results in a deformation of the membrane; the deformation of the membrane results in a shifting of the armature; the shifting of the armature results in a change of the induction of the induction winding, which results in an electric signal generated in the circuit, which electric signal is, in the form of an order of turn ON/OFF the water, transferred via a connector, a respective cabling of the machine and the machine process layout to the execution organ.

Related background information can also be found in DE 197 54 616 (Nomura et al.) and DE 41 04 477 (Lövel) as well as WO 2005/002887 (Chen et al.).

The circuit disclosed in the prior art solution is embodied to form a printed circuit board, with a relatively miniature connector (not shown in the disclosure) being annexed to plug points thereof. The securing against dismounting, which not shown in the disclosure, but is necessary because the transducer is subjected to vibrations, is provided by fixing the printed circuit board to an end wall of a transducer support body on the opposite side of a membrane. It is a disadvantage of such a design that only such connectors are applicable, whose main assembling plane coincides with or is parallel to the main plane of the printed circuit board. This, however, is not always the best solution in the practice.

SUMMARY

One object of the present invention is thus to provide a securing of the connector against dismounting, whereat the main assembling plane of the connector is invariant concerning the main plane of the circuit, with the housing of the transducer not being substantially involved in the securing against dismounting. This practically means that sufficient securing is established merely by one end section of the connector, i.e. without involving the housing.

This object is achieved according to the invention by providing a transducer of the aforesaid type, in which the circuit is an embedded contact lamella provided with electronical members. The circuit comprises un upper shaped molded layer and a lower shaped molded layer bound to each other by material straps formed in recesses of the contact lamella, whereat at least in one of the two molded layers gaps for mounting electronic members/components are foreseen.

The technology of providing such a circuit further makes it possible to provide three-dimensional configurations that cannot be realized by the printed circuit technology. Thus, according to this invention, integrally with the step of embedding, a snap arrangement for engaging and retaining a connector positioned at the plug point side is prepared.

BRIEF DESCRIPTION OF THE DRAWING

Hereinafter, the invention is disclosed in more detail by way of an embodiment of the inventive transducer shown in the enclosed single drawing, FIG. 1, which is an axial sectional elevation of the respective transducer.

DETAILED DESCRIPTION OF EMBODIMENTS

The transducer comprises a tripartite housing 1, which in its functional aspect together with inner equipment constitutes an upstream section A and a downstream section B.

A lower part 1a of the housing 1 having a nipple 1a' and a tube (not shown in the drawing) connected to the nipple 1a' constitute the upstream section A of the transducer.

An upper inner part 1b of the housing 1 with associated elements and an upper outer part 1c of the housing 1 constitute the downstream section B of the transducer.

A membrane 2 is hermetically engaged between the lower part 1a and the upper inner part 1b of the housing 1, the membrane 2 representing a physical division of functional sections A, B with a chamber P, Q existing on the upstream side and the downstream side of the membrane 2, respectively. Air is in both chambers.

Similarly to the lower part 1a, to which the nipple 1a' is added, a multipurpose tubular bearing 1b' is added to the upper inner part 1b of the housing 1. At the end of the bearing 1b' closest to the membrane 2 an inductive winding 3 resides on its outer side, and axially remotely from the inductive winding 3 in its cross-sectional plane a guide 4 for engaging a circuit resides, into which guide 4 a plate 5 having a contact lamella (an analogue of an integrated circuit) and electronic outfit is inserted and secured against dismounting, with the plate 5 being horseshoe-shaped in this embodiment. As to the inner side of the multipurpose tubular bearing 1b', in turn, a cylindrical armature 6 is fixed on the membrane 2 in the downstream chamber Q, with the diameter of the armature 6 being adapted to the nominal diameter of the tubular bearing 1b' and the armature 6 supported against the membrane 2 with a pressure spring 7. A stable plug 8 penetrable by air and retained with the free end of the tubular bearing 1b' supports another end of the pressure spring 7.

The multipurpose upper outer part 1c of the housing 1 serves as a cover of both the upper inner part 1b of the housing 1 and the accompanying members and as an element for fastening the respective transducer to the machine. Besides, in the upper outer part 1c there is foreseen an opening 1c', through which from outside a connector K is attached to the plate 5, by which connector K the transducer is incorporated into the processing layout of the machine.

Prior to starting the machine contains no water and atmospheric pressure prevails in the upstream section A of the transducer. After the beginning of the water supply, the tube of the transducer connected to the nipper 1a' gets flooded and the air on the upstream section A of the transducer is trapped. The pressure of trapped air increases/decreases by the hydrostatic pressure of increasing/decreasing the level of water in the flood basin of the machine. The compressibility of air is compensated at the adjusting of the transducer in the respective pressure conditions. The change of the air pressure at the upstream section A of the transducer results in the shifting of the membrane 2. Since the armature 6 moves together with the membrane 2, the magnetic field generated by the inductive winding 3 changes. The change of the magnetic field is transformed into an electric signal in the electronic outfit of the plate 5 and the electric signal is sent by the processing appliance of the machine to an execution organ as an order to turn the water ON/OFF.

The invention claimed is:

1. Transducer for transforming information relating to a water level in a flood basin of a machine into an electric signal, said transducer comprising:
   a transducer housing;
   upstream and downstream housing sections having a membrane disposed hermetically therebetween so as to define upstream and downstream chambers respectively, the upstream and downstream housing sections being at least in part enclosed by the transducer housing;
   said upstream housing section comprising a tube adapted to connect the upstream chamber with the flood basin of the machine;
   said downstream housing section comprising a spring-biased, essentially cylindrical armature fixed to said membrane, said armature being axially movably within a tubular extension of the downstream section;
   an inductive winding disposed in said transducer housing and arranged to surround a portion of the tubular extension, and
   a substantially flat circuit arrangement disposed in said housing of the transducer and supported by a guide formed on the tubular extension, said flat circuit arrangement being operatively connected with the inductive winding and having a side that is configured to accommodate a connector.

2. Transducer according to claim 1, further comprising, a snap arrangement for engaging and retaining the connector positioned at the side of the flat circuit arrangement.

3. Transducer according to claim 1, wherein the housing of the transducer has an opening into which the connector can be disposed so as to extend toward the flat circuit and establish an operative connection with the flat circuit arrangement.

4. Transducer according to claim 1, wherein the connector has a plug-like body member and a snap member configured to engage a barb-like projection formed in the transducer housing so as to retain the connector in operative connection with the flat circuit arrangement.

* * * * *